O. MESSTER.
MECHANISM FOR THE FEEDING OF KINEMATOGRAPH FILMS.
APPLICATION FILED JULY 30, 1909.

955,840.

Patented Apr. 19, 1910.

Witnesses:
P. F. Nagle.

Inventor:
Oscar Messter.
By Wiedersheim & Fairbanks,
Attorneys

UNITED STATES PATENT OFFICE.

OSKAR MESSTER, OF BERLIN, GERMANY.

MECHANISM FOR THE FEEDING OF KINEMATOGRAPH-FILMS.

955,840.

Specification of Letters Patent. Patented Apr. 19, 1910.

Application filed July 30, 1909. Serial No. 510,380.

*To all whom it may concern:*

Be it known that I, OSKAR MESSTER, residing at Berlin, Germany, and a subject of the King of Prussia, German Empire, have invented certain new and useful Improved Mechanism for the Feeding of Kinematograph-Films, of which the following is a specification.

This invention relates to the feeding of kinematograph films. It is at present well known to feed forward films of kinematographs by means of organs or devices which move at different speeds during their operation. Further, it is also known to feed a film in such a manner that the period of feed is materially shortened and the period of rest between successive feeds correspondingly lengthened. Under my invention I provide special feeding mechanism which is so made as to cause the organ which moves the film forward and which itself also rotates on a spindle to be rotated by suitable gearing about a second spindle arranged eccentric to the first one.

In order that the invention may be clearly understood I have hereunto appended an explanatory drawing whereon one embodiment of the mechanism is shown.

Figure 1:
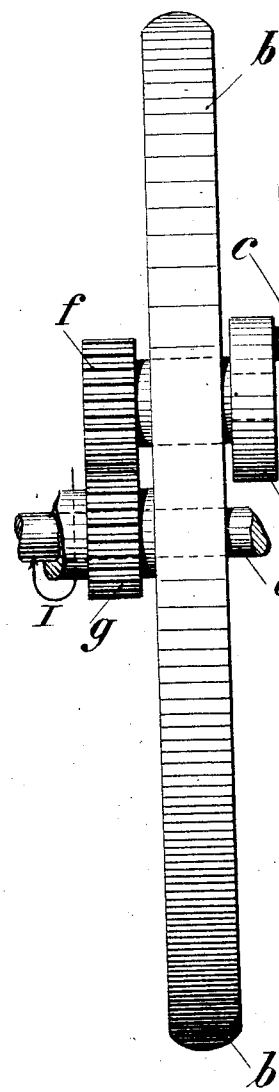

In Figure 1 $a$ is the driving shaft, on to which a disk $b$ is keyed said shaft $a$ rotating in the direction of the arrow I in Fig. 1. A pin $e$ is rotatably mounted in the disk $b$ so that it will turn, and on to this a wheel $d$ is keyed. The wheel $d$ carries the stud or pin $c$ which effects the forward feed of the picture film $i$ shown in Fig. 2 in dotted lines. Behind the disk $b$ a toothed wheel $f$ is keyed on the pin $e$ and this wheel engages with a second toothed wheel $g$, loosely carried on the driving shaft $a$. The toothed wheel $g$ on the driving shaft $a$ can be kept standing still or made to rotate at a predetermined speed and in a predetermined direction, according to the relative proportions of the two toothed wheels $f$ and $g$. The toothed wheel $g$ is made to revolve in a direction and at a speed selected, in each case, so as to insure that the wheel $d$ makes one or more full revolutions about its own spindle $e$ for every revolution of the driving shaft $a$. The stud or pin $c$ which effects the forward feed of the picture film $i$ will consequently, in the first of the above mentioned cases for example, describe the cardiform curve $h$ shown in Fig. 2 in dotted lines while the driving shaft $a$ makes one revolution.

Figure 2:
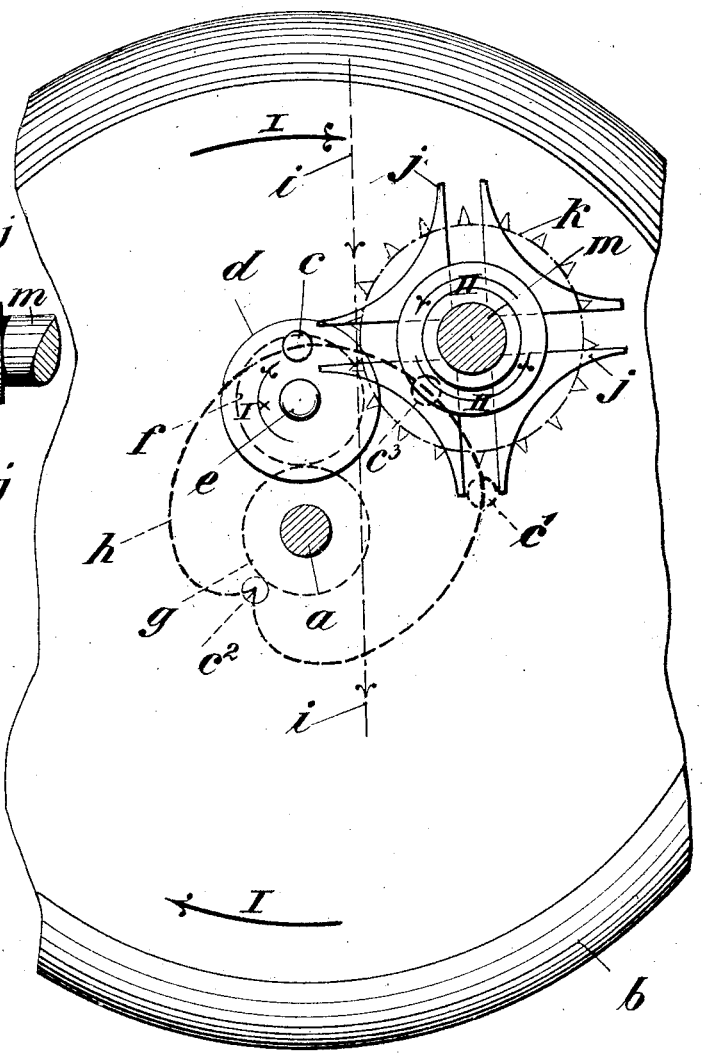

The angular velocity of the stud or pin $c$ for feeding the film $i$ forward, when said stud or pin $c$ is in the position shown at $c^3$ by dotted lines in Fig. 2 is equal to the angular velocity of the driving shaft $a$ plus the angular velocity of the wheel $d$. As the stud or pin $c$ moves further its angular velocity with respect to the driving shaft $a$ diminishes and it is at its minimum when said stud or pin $c$ is in the position $c^2$ shown in Fig. 2 by dotted lines, this being the case between the positions $c$ and $c'$ of the stud or pin $c$ of the wheel $d$ on the curve $h$.

The mechanism is so adjusted that the forward feeding stud or pin $c$ actually moves the film $i$ forward when it is at its highest angular velocity.

In the constructional form of my invention represented in the drawings I effect the transmission of motion by a wheel $j$ of Maltese-cross pattern, said wheel $j$ being keyed upon a rotary shaft $m$ and being used for imparting a periodic forward feed movement to the picture film $i$ by means of the usual sprocket-wheels, one of which $k$ is represented in dotted lines in Fig. 2. The reason for the film $i$ and the sprocket-wheel $k$ being shown in dotted lines in Fig. 2 is that these parts $i$ and $k$ being of well known construction need only thus be shown, and are omitted entirely from Fig. 1.

The stud or pin $c$ of the wheel $d$ which is rotated in the direction of the arrows I$^x$ in Fig. 2 moves the Maltese cross wheel $j$ in the direction of the arrows I, I, Fig. 2, whereby the said stud or pin $c$ in imparting to the Maltese-cross wheel $j$ a quarter of a turn passes from the position $c$ into the position $c'$.

Having now fully described my invention what I claim and desire to secure by Letters Patent is:—

1. Mechanism for feeding kinematograph films, embodying a rotatable spindle, a disk on the spindle, a toothed pinion on said spindle, a secondary spindle eccentric to the first and carried by said disk, a pinion on one end of said eccentrically-arranged spindle, a disk with a laterally projecting pin therein at the opposite end of said spindle, a rotary wheel of Maltese-cross pattern with its spindle out of alinement with the first-named spindle, and means for transmitting the motion from said Maltese-cross wheel to the film.

2. Mechanism for feeding kinematograph films, embodying a rotary spindle, a disk on said spindle, a toothed pinion on the spindle, a secondary spindle eccentrically disposed with relation to the first-named spindle and carried by said disk, a pinion at one end of said eccentrically arranged spindle, a disk with a laterally projecting pin therein at the opposite end of said spindle, an additional spindle parallel to the first-mentioned spindle and out of alinement therewith, a Maltese-cross wheel keyed upon said additional spindle, said laterally projecting pin of said disk meshing with said Maltese-cross wheel to drive the same, and sprocket wheels keyed upon said additional spindle for feeding the kinematograph film forward.

In testimony whereof I affix my signature in presence of two witnesses.

OSKAR MESSTER.

Witnesses:
HENRY HASPER,
ARTHUR SCHROEDER.